Jan. 16, 1934.   G. H. HARTMAN   1,943,604
GREASE DELIVERY DEVICE
Filed April 6, 1931   2 Sheets-Sheet 1
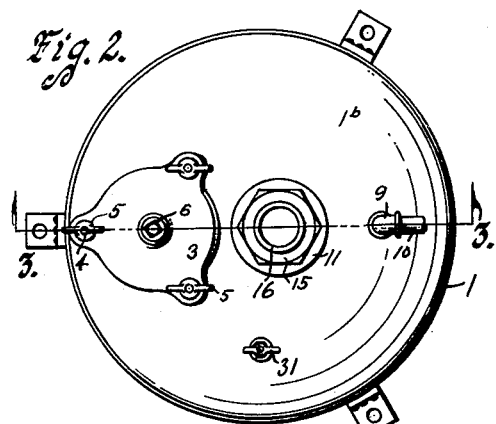
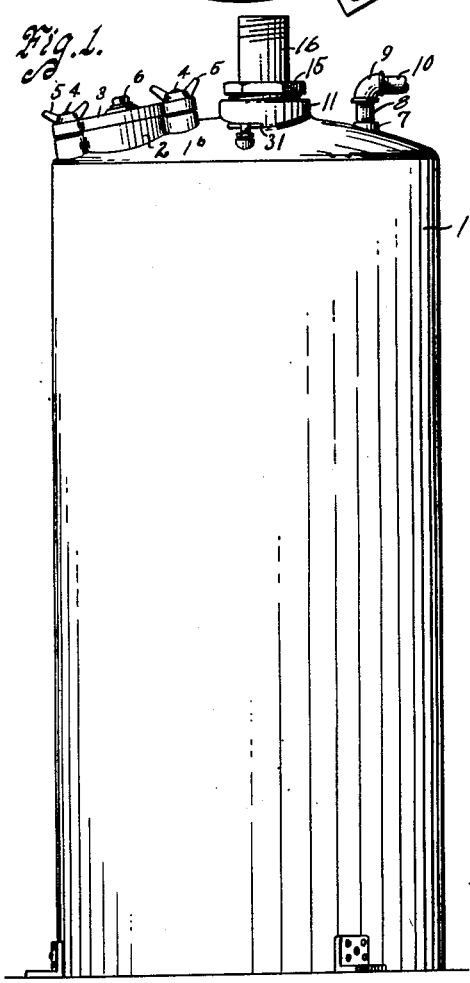
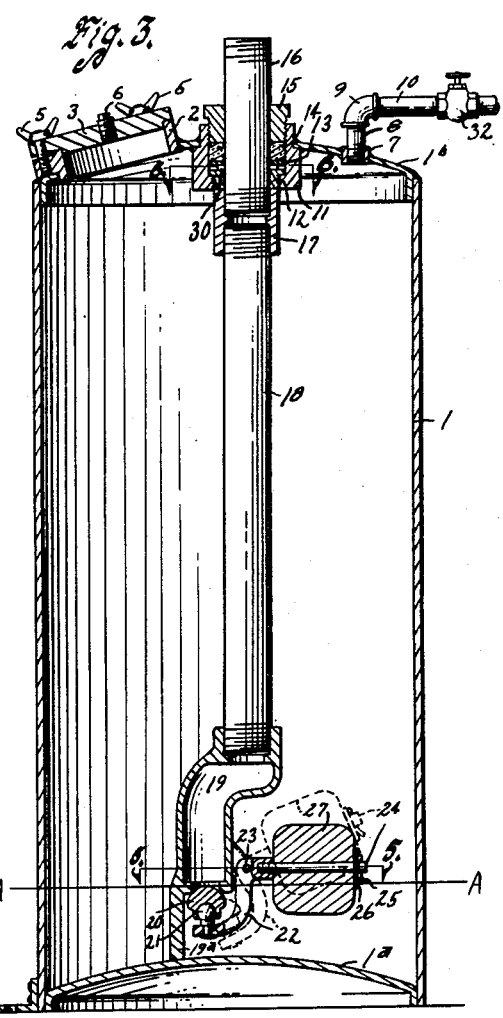
Inventor
~George H. Hartman~
By Bair, Freeman & Sinclair
Attorneys
Witness
H. S. Wingenmaier Jan. 16, 1934.    G. H. HARTMAN    1,943,604
GREASE DELIVERY DEVICE
Filed April 6, 1931    2 Sheets-Sheet 2
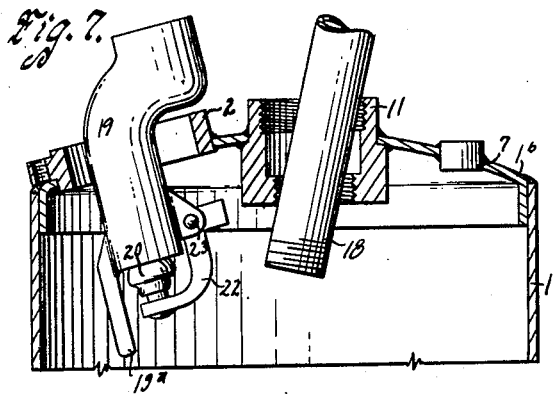
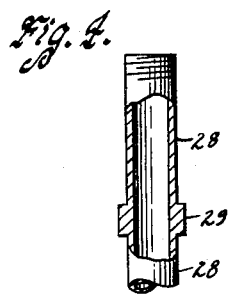
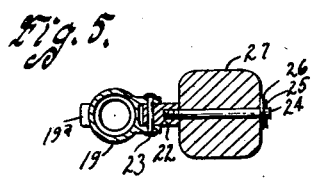
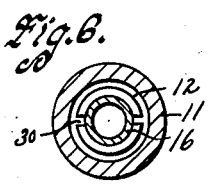
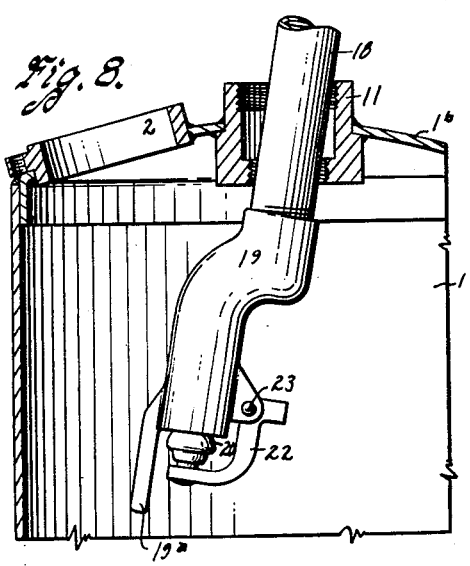
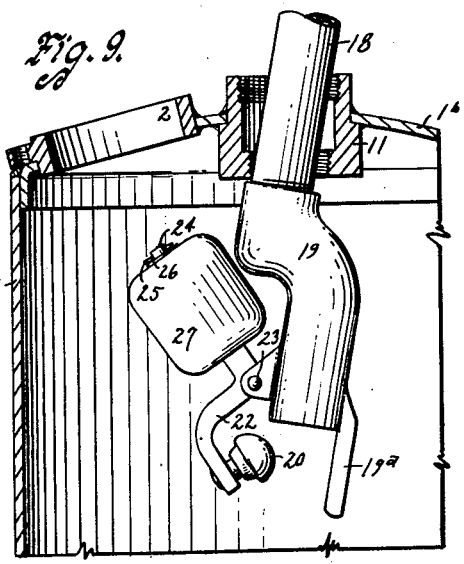
Inventor
George H. Hartman
By Bair, Freeman & Sinclair
Attorneys
Witness
H. L. Mungenmair Patented Jan. 16, 1934

1,943,604

UNITED STATES PATENT OFFICE 1,943,604

GREASE DELIVERY DEVICE

George H. Hartman, Bryan, Ohio, assignor to The Aro Equipment Corporation, Bryan, Ohio, a corporation of Ohio Application April 6, 1931. Serial No. 528,015

9 Claims. (Cl. 221—74)

This invention relates to a grease delivery device particularly to that type consisting of a steel tank in which grease is placed and from which it is delivered by compressed air being fed into the top of the tank.

One object of my invention is to provide in installations of this nature, means to prevent the air from being passed out of the tank when the grease has reached a certain minimum low level. In existing designs this must be accomplished manually as to the best of my knowledge and belief no automatic float valve construction has been so far designed or used that can be installed in a welded steel tank of the type shown in my drawings.

It will be understood by those familiar with service stations that the tank here shown is one in which either gear lubricant or high pressure grease can be placed and that pipes which I do not show extend from the tank to the various points where the grease is to be used.

Another object of my invention is to provide a removable float valve that can be taken from the tank and repaired when access to the valve is only through the small filler hole with which these tanks are provided, to enable filling with grease.

Another object of my invention is to provide removable means of installing a float valve of this nature that will not leak air and an air sealing means that will not be subjected to movement or wear.

Another object of my invention is to provide a holding means for the float valve that can easily be installed in a majority of the existing tanks that have welded ends.

Further objects and advantages of my invention are apparent from the following detailed description.

While the invention in its broader aspect is capable of embodiment in various forms, a preferred embodiment thereof, and of mechanism forming the same, are illustrated in the accompanying drawings in which:

Figure 1 is an outside view of the tank with a portion removed.

Figure 2 is a plan view of the tank shown in Figure 1.

Figure 3 is a sectional elevation taken along the line 3—3 of Figure 1.

Figure 4 is an optional design of making one portion of the mechanism shown in Figure 3.

Figure 5 is a section taken along the line 5—5 of Figure 3.

Figure 6 is a section taken along the line 6—6 of Figure 3.

Figure 7 is a diagrammatic view showing one position in the assembly of the mechanism.

Figure 8 is a diagrammatic view showing another position in the assembly of the mechanism; and Figure 9 is a diagrammatic view showing still another position in the assembly of the mechanism.

1 is the steel tank having a welded in bottom 1a and a welded in top portion 1b. At one side of the top is fitted a filler hole ring 2. This ring is welded on to the cover 1b so as to form an air tight connection around its outer periphery. Fitted to the top of the ring 2 and extending for a ways internal thereof is a plate 3. Studs 4 project up from the ring 2 through the plate 3 and carry wing nuts 5 at their upper ends, these wing nuts and studs being used to clamp the plate 3 tightly against the upper end of the ring 2 for the purpose of preventing pressure internal of the tank from escaping. A gasket, not shown, could be used under the plate 3 if this is found desirable to form an additional aid for sealing pressure that might be internal of the tank 1.

At the center portion of the cover 3 is shown a pipe plug 6. The hole shown sealed by the pipe plug has no bearing upon the present invention but it can be used for a gauge or blow off valve or any of the other accessories generally used in connection with pressure tanks.

At the opposite side of the top of the cover 1b is a flange 7 welded on to the tank 1 for air tight connection around its outer periphery, its center portion being tapped out to receive one end of a pipe 8, the opposite end of the pipe being threaded into an elbow 9. A pipe 10 extends outward from the elbow 9 to a source of compressed air supply. The means for producing the source of compressed air supply, is of any conventional method and is not here shown or otherwise described.

In the cover 1b is a hole through which projects one end of a sleeve 11. The lower end of the sleeve 11 is enlarged in diameter to a dimension larger than the hole in the cover 1b and at its periphery along contact with the cover 1b is welded to same to form an air tight connection therewith. Internal of the sleeve at the lower end thereof is a threaded portion into which a bushing 12 is screwed. Above the bushing 12 is a washer 13 which supports a packing 14 held in place by a second bushing 15 which is screwed into a tapped portion in the upper part of the sleeve 11. Extending through the center of the bushings 15 and 12, washer 13 and packing 14 is a pipe 16. The lower end thereof is threaded to receive one end of a coupling 17, the lower end of the coupling being threaded to receive the threaded upper end of a second pipe 18 which projects down to a point near the bottom of the tank 1 to receive the float valve body 19 more completely hereinafter described. The top end of the pipe 16 is threaded to receive pipe fittings which will connect the pipe 16 with various pipes to which it is found desirable to deliver the contents of the container 1. The method by which the material is conveyed through pipes 18 and 16 will be more completely described hereinafter.

The float valve body 19 is threaded at its upper portion to receive the lower threaded end of the pipe 18. At the lower end of the float valve body 19 is a hole in which is operatively positioned a valve member 20. This member 20 is swiveled for rotary movement on the upper end of a stem 21, the lower end of the stem 21 being contained tightly in one end of a valve operating lever 22. The valve operating lever 22 is journaled about a pin 23 carried in projecting lugs extending from the side of the body 19. The end of the valve operating lever 22, opposite to that end in which the stem 21 is fastened, contains a tapped hole into which is threaded one end of a rod 24. The outer end of this rod 24 contains a cotter key 25, serving as a retainer for a washer 26, a wood float 27 being retained in position on the rod 24 between the end of the lever 22 and the washer 26. A downward extending lug 19a projects from the body 19 and contacts with the bottom 1a of the tank 1, this serving to prevent the float valve body being lowered to a point that would make the float lever 22 inoperative, which would be the case if this touched the bottom of the container at any point in its operation.

In Figure 4 I have shown an optional form of construction which would make pipes 16 and 18 in one piece 28, a shoulder 29 serving the purpose for which I have provided coupling 17 as shown in Figure 3.

The assembly of this mechanism in the tank 1 is as follows: The cover 3 is removed. The parts 15, 14, 13 and 12 are not yet placed in their position in the sleeve 11. The assembled pieces 16, 17 and 18 are now started through the sleeve 11 to internal of the tank 1 (Figure 7). The outside diameter of the coupling 17 is small enough so that it will just pass through the small threaded internal portion of the sleeve 11. At the same moment that the end of the pipe 18 projects into the tank 1 through the sleeve 11, the float valve body 19, with all its associated parts, except 24, 25, 26 and 27, is lowered through the hole formed internal of the filler ring 2 as shown in Figure 7. As the float valve housing is brought into position shown in Figure 8, the threaded lower end of the pipe 18 is screwed into the upper end of the body 19. A wrench not shown is inserted through the hole in filler ring 2 to clamp the float valve body 19 and another wrench put onto the pipe 18 that still extends external of the tank 1 and the joint formed by 19 and 18 is screwed to an air tight connection. The assembled unit is now revolved to position shown in Figure 9, and the rod 24 screwed into place in the end of the lever 22. The float 27 is now slipped onto the rod 24 and the washer 26 and cotter key 25 assembled into position. The entire assembly formed by the pipes 16 and 18 with the float valve 19 and its associated parts is now lowered into the position shown in Figure 3. This brings the upper edge of the coupling 17 just within and below the lower edge of the sleeve 11. The nut 12 is now screwed into the tapped lower portion of the sleeve 11. To effect a screwing in of the nut 12 I have provided slots 30 at the upper edge of the nut 12 so that engagement can be made with a special wrench or otherwise as may be found most convenient.

To protect the packing 14 and to prevent its getting into this wrench slot 30 shown in Figure 6, I have provided the washer 13 which is now deposited in so as to rest on the top of nut 12. Packing 14 is now forced into the sleeve 11, this resting on top of washer 13. The nut 15 is now screwed into the upper portion of this sleeve 11. The upper portion of this nut 15 is hexagonal, as shown in Figure 2 so that a wrench may be applied to screw it down tightly against packing 14 so that the packing 14 is expanded to entirely fill the space internal of the sleeve 11 and around the pipe 16 so as to prevent a leakage of pressure from internal of the tank to external of the tank.

The operation of this device is as follows: With the members all assembled as shown in Figure 3 and the proper connections made from the upper end of the pipe 16 to the points where the contents of the container may be used, the cover 3 is removed from the filler ring 2 and grease or other oil which it may be desired to dispense is placed internal of the container 1, by filling through the opened hole in the ring 2. After filling replace cover 3 tightly. The pipe 10 being connected with a source of compressed air is now permitted to flow into the tank 1, on top of the grease or oil now disposed internal therein. The float 27 being of wood, it now rises by floating to the dotted position shown in Figure 3 which lifts the valve 20 and permits the contents of the container to be forced by the air pressure through the hole in the lower end of the valve body 19 up through the valve body, pipe 18 and pipe 16 and out to wherever other pipes not shown may so carry.

The level of the grease in the container will drop as it is used out and will finally reach a point indicated by the line A—A in Figure 3 at which point the float 27 settles to the full line position shown in Figure 3 bringing the valve 20 into a closed coacting position on its seat. The remainder of the grease disposed at the bottom of tank 1 cannot be removed.

To refill the tank it is necessary to release air from the tank by opening the release valve 31 shown in Figures 1 and 2 and closing the valve 32 in the intake line 10 (Figure 3). These valves 32 and 31 are standard and easily understood by anyone familiar to the art to which this invention appertains and are not further shown or otherwise described.

The purpose of the coupling 17 and the construction shown in Figure 4 by the enlarged portion 29 is to bring the enlarged diameter into the tank 1 and as a part of the pipes consisting of assembly 16 and 18 so that the pressure internal of the tank will not blow the pipes 18 and 16 out of the hole in the cover 1b and yet present construction whereby, by the removal of a couple of nuts and the packing, the entire float valve structure can be removed from the small existing hole that is now found in all tanks of this nature for filling same.

It is evident that the filler hole need not be located in top cover 1b as I have shown it but it can be located at any point in the container top, bottom or sides without affecting the assembly as I have hereinbefore described it.

While this specification sets forth in detail the present and preferred construction of my mechanism, still in practice such deviations from such detail may be resorted to as do not form a departure from the spirit of the invention as defined by the appended claims.

Having thus described my invention what I claim as new and desire to secure by Letters Patent is:

1. In a grease delivery device, a container having a top provided with an opening, a removable shoulder element in said opening, a discharge tube extending removably through said opening and through said shoulder element to a point near the bottom of said container, a tubular retainer fixed in said opening and spaced from said shoulder element and an abutment on said discharge tube engaging the inner end of said shoulder element to lock said tube against sliding movement outwardly through said opening and shoulder element.

2. In a grease delivery device, a container having a top provided with an opening, a removable shoulder element in said opening, a discharge tube extending removably through said opening and into said container, a valve at the lower end of said discharge tube, means to force grease through said tube to the exterior of said container, means operable to close said valve when grease inside the container reaches a predetermined low level, a tubular retainer fixed in said opening and spaced from said shoulder element and an abutment on said discharge tube engaging the inner end of said shoulder element to lock said tube against sliding movement outwardly through said opening and shoulder element.

3. In a grease delivery device, a container having a top provided with an opening, a sleeve in said opening and secured to said container, said sleeve being threaded at its upper end to receive a second sleeve of smaller diameter and at its lower end having a third sleeve of smaller diameter, a discharge tube extending through said second and third sleeves to a point near the bottom of said container, an enlarged portion of said tube coacting at its upper edge with the lower edge of said third sleeve, a packing chamber being formed internally of said first sleeve, externally of said tube and between the second and third sleeves, and packing therein.

4. In a grease delivery device, a container having a cover with a discharge tube projecting loosely through a first hole therein, said discharge tube extending to a point near the bottom of said container, a valve in the lower end of said discharge tube, the first hole serving for insertion of a discharge tube, a second hole in said cover adjacent said first hole for insertion of said valve for assembly to said discharge tube when internal of said container, means to entirely lock said discharge tube against movement in said first hole and to seal it relative thereto after said valve has been assembled and means to close and seal said second hole.

5. In a container of the class described, the combination of a tank with closed ends, a fluid outlet pipe extending from the lower portion of said tank, up through the top thereof, a removable shoulder element on said outlet pipe having an abutment to engage the inner surface of said shoulder element, a valve at the lower end of said pipe, removable means on said top to engage said pipe and thereby retain it aligned with and against reciprocatory movement relative to said top, means for supplying compressed air to said tank to force liquid dispensed internal thereof out through said pipe to external of the tank and automatic means operable to close the valve when the deliverable fluid reaches a predetermined low level.

6. In a device of the class described, a container having a pair of openings therein adjacent each other, a discharge tube extending loosely through one of said openings, means for tightening and packing said tube relative to said opening, a cover for the second opening and a float valve removably associated with the inner end of said discharge tube, said float valve comprising a Z-shaped tube extending downwardly from said discharge tube, then laterally and then downwardly, a float arm pivoted to said last mentioned downwardly extending portion of said Z-shaped tube and below the laterally extending portion thereof, a valve plug on one end of said float arm for coaction with the lower end of said last mentioned downwardly extending portion of said Z-shaped tube and a float removably associated with the other end of said float arm, said float valve and said float being insertable through said second opening.

7. In a grease delivery device, a container having a cover provided with an opening, a removable shoulder element associated therewith, a discharge tube extending removably through said opening to a point near the bottom of said container, a tubular retainer fixed in said opening and spaced from said shoulder element, an abutment on said discharge tube engaging said shoulder element to lock said tube against reciprocatory movement in said opening and packing within said opening between said retainer and said shoulder element to prevent leakage from said container between the wall of said opening and said discharge tube.

8. In a device of the class described, a container having a cover with a tube projecting loosely through a first hole therein, a fitting at the lower end of the tube, the first hole serving for insertion of the tube, a second hole in the cover adjacent the first hole for insertion of the fitting for assembly to the tube when internal of the container, means to tightly lock the tube against movement in and looseness relative to the first hole and to seal it relative thereto after the fitting has been assembled and means to close and seal the second hole.

9. In a device of the class described, a container having a pair of openings therein adjacent each other, a tube extending loosely through one of said openings, means for tightening and packing said tube and thereby eliminating its looseness relative to said opening, a cover for the second opening and a fitting removably associated with the inner end of said tube, said fitting being Z-shaped and extending downwardly from said tube, then laterally and then downwardly, said fitting being insertable through said second opening.

GEORGE H. HARTMAN.